(12) United States Patent
Grove-Nielsen

(10) Patent No.: US 10,041,193 B2
(45) Date of Patent: Aug. 7, 2018

(54) SANDWICH CORE MATERIAL

(71) Applicant: SIEMENS AKTIENGESELLSCHAFT, München (DE)

(72) Inventor: Erik Grove-Nielsen, Roslev (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 366 days.

(21) Appl. No.: 14/812,818

(22) Filed: Jul. 29, 2015

(65) Prior Publication Data

US 2015/0329993 A1 Nov. 19, 2015

Related U.S. Application Data

(62) Division of application No. 13/726,738, filed on Dec. 26, 2012.

(30) Foreign Application Priority Data

Dec. 28, 2011 (EP) .................................. 11195912

(51) Int. Cl.
| | | |
|---|---|---|
| *B29C 70/38* | (2006.01) | |
| *D01F 8/00* | (2006.01) | |
| *B32B 5/00* | (2006.01) | |
| *F03D 1/06* | (2006.01) | |

(52) U.S. Cl.
CPC ................ *D01F 8/00* (2013.01); *B32B 5/00* (2013.01); *F03D 1/0675* (2013.01); *F05B 2250/12* (2013.01); *F05B 2280/6012* (2013.01); *Y02E 10/721* (2013.01); *Y02P 70/523* (2015.11); *Y10T 156/10* (2015.01); *Y10T 156/1062* (2015.01); *Y10T 428/13* (2015.01); *Y10T 428/249921* (2015.04); *Y10T 428/2913* (2015.01); *Y10T 428/2973* (2015.01); *Y10T 428/2975* (2015.01)

(58) Field of Classification Search
CPC ..... B29C 70/38; B29C 70/382; B29C 70/384; B29C 70/388; B29C 70/10
See application file for complete search history.

(56) References Cited

U.S. PATENT DOCUMENTS

| | | | |
|---|---|---|---|
| 4,025,686 A | * | 5/1977 | Zion ..................... B29C 70/025 264/46.5 |
| 7,169,343 B1 | * | 1/2007 | Mills .................... B29C 44/569 156/173 |
| 7,887,730 B2 | | 2/2011 | Karem |
| 7,895,745 B2 | | 3/2011 | Althoff et al. |
| 8,178,183 B2 | | 5/2012 | Jacobsen |

(Continued)

FOREIGN PATENT DOCUMENTS

| | | |
|---|---|---|
| CN | 101277814 A | 10/2008 |
| CN | 102186646 A | 9/2011 |

(Continued)

*Primary Examiner* — Matthew J Daniels
*Assistant Examiner* — Kelsey C Grace

(57) ABSTRACT

A sandwich core material for a sandwich laminate is disclosed. The sandwich core material includes a number of flexible core material elements having a longitudinal structure. A flexible core material for a sandwich core material, a sandwich laminate and a wind turbine blade including such a sandwich core material are provided. In addition, the present a method of manufacturing such a sandwich core material is provided.

10 Claims, 3 Drawing Sheets

(56) References Cited

U.S. PATENT DOCUMENTS

| | | | |
|---|---|---|---|
| 8,485,786 B2 | 7/2013 | Jensen | |
| 2006/0252334 A1* | 11/2006 | LoFaro | B32B 5/022 |
| | | | 442/400 |
| 2009/0061198 A1 | 3/2009 | Khambete | |

FOREIGN PATENT DOCUMENTS

| | | |
|---|---|---|
| EP | 2153964 A1 | 2/2010 |
| EP | 2404742 A1 | 1/2012 |
| WO | 2007048409 A1 | 5/2007 |
| WO | 2008086805 A2 | 7/2008 |

\* cited by examiner

SANDWICH CORE MATERIAL

CROSS REFERENCE TO RELATED APPLICATIONS

This application is a divisional of and claims priority to U.S. application Ser. No. 13/726,738, filed Dec. 26, 2012, which claimed priority to European Patent Office Application No. 11195912.8 EP, filed Dec. 28, 2011. All of the applications are incorporated by reference herein in their entirety.

FIELD OF INVENTION

The disclosure relates to a sandwich core material, in particular for sandwich laminates used in fibre reinforced plastic composites and to a core material element for such sandwich core materials. The disclosure further relates to a sandwich laminate and a wind turbine blade comprising such a sandwich core material as well as to a method of manufacturing such sandwich core material.

BACKGROUND OF INVENTION

In order to make lightweight and stiff constructions, sandwich constructions are often applied. Sandwich construction materials usually comprise a central lightweight core material, the sandwich core material, and one or more skin layers of composite laminate structures applied on each side of the sandwich core material, which are usually made of fibre reinforced resin materials.

Commonly used sandwich core materials are plates of end grain balsa wood, honeycomb cell structures made of aluminium, card board or paper, plates of thermoplastic foam material such as PVC, PET foam or any other such materials. The sandwich core materials are usually delivered as kits, with all plates carefully machined to fit to each other. The placement of these plates in moulds has up to now been done by hand lay out and is, thus, time consuming and labour intensive.

SUMMARY OF INVENTION

An improved sandwich core material, flexible core material element, sandwich laminate and wind turbine blade as well as an improved method of preparing such sandwich core materials, especially a more cost-efficient and less time consuming process are provided by the independent claims.

The sandwich core material is particularly adjusted for the manufacturing of a sandwich laminate. Such sandwich laminates may be fibre reinforced plastic composites for the use in a variety of technical products such as cars, aeroplanes, wind turbine blades, storage tanks etc. The sandwich core material comprises a number, i.e. at least one, possibly a plurality (e.g. two, three or more), of flexible core material elements having a longitudinal structure.

A sandwich core material may be produced from any material as long as it can be provided in a substantially longitudinal structure. An element having a longitudinal structure means that the dimension in one direction is greater than in any other direction by several ten or hundred orders of magnitudes. Common wind turbine blades having a length of about 40-50 meters usually have a width of about 3 meters. The thickness of the blades is commonly about 2 meters, which is similar to the diameter of the root. It may also be a substantially endless core material element which is cut at the respective length needed for manufacturing the sandwich core material. "Endless" means that the length of the element is longer than it is needed for the production of one core material part.

In addition, the flexible core material elements are flexible elements, which are suitable for being wound around a bobbin and/or a roll and are, therefore, different to the commonly used substantially stiff core elements in plate-like shapes. Thus, the core material may be easily transported or stored. In addition, the core material may easily be handled during its use, for example in manufacturing a sandwich laminate.

Therefore, a sandwich laminate comprises such a sandwich core material and at least one sandwich skin layer on a first and/or a second surface of the sandwich core material. One or more sandwich skin layers may be provided on each surface of the sandwich core material. The sandwich skin layer material is usually made of a fibre reinforced plastic material to strengthen the stiffness of the sandwich laminate product. The sandwich laminate mainly extends in two dimensions, such as a plate or a constructional part of a car, aeroplane, wind turbine blade, etc.

Accordingly, the wind turbine blade comprises a sandwich core material or sandwich laminate as described before. Wind turbine blades are usually mostly extended in one direction, while the other two dimensions are substantially smaller than the first one. Therefore, the sandwich core material being manufactured of core material elements having a longitudinal structure may save costs because grinding or cutting plates of the core material are not necessary during the manufacturing process. In addition, waste of core material is strongly reduced because the core material elements may be suitably arranged in line with the longitudinal extension of the final product. This again reduces the costs of disposal waste core material.

In a further aspect, the method of manufacturing such a sandwich core material comprises the step of arranging, i.e. disposing, deploying, extruding, etc., a number of core material elements having a longitudinal structure into a mould. A mould may be any mould which is suitable for producing the sandwich core material in a desired shape. A mould may have two halves wherein the finished product is pressed and finished by pressing both halves against each other.

The method provides that the sandwich core material may be suitably arranged, disposed or placed at a desired position in the mould by arranging the flexible sandwich core element as desired. Next to the first element, a second or third or a plurality of elements may be placed in the mould. Of course, the sandwich core elements may be placed in one layer, in which each element has one or two neighbouring elements only, or may be arranged in a layer stack comprising a plurality of layers, such as two, three, four, five or more layers. Thus, a variety of shapes of the final sandwich core material products may be prepared with the same sandwich core element. This allows improved design variability.

Embodiments and features are given by the dependent claims, as revealed in the following description. Further embodiments may be derived by combining the features of the various embodiments described in the following, and features of the various claim categories can be combined in any appropriate manner.

The sandwich core material may comprise a number of flexible sandwich core elements with a specific longitudinal, in particular a substantially endless, structure. Examples of such flexible core material elements are those comprising tows or threads comprising a substantially flexible material.

Such tows or threads may be delivered or stored on a bobbin or roll to reduce storage and/or transport costs.

The core material elements such as the tows or threads may comprise or are manufactured of a number of fibres and/or tubes and/or hoses. Hence, each tow or thread may consist of one or a plurality of fibres, tubes, hoses, or mixtures thereof. In an embodiment those fibres, tubes or hoses are preliminarily prepared and bonded together, especially if multiple fibres are combined in one tow or thread. This may be done by, e.g. gluing or melting the fibre surface materials together in order to prepare a tow. The number of fibres bonded together to a tow depends on the desired thickness of the tow and may be increased as long as the fibres are fixed strong enough to avoid any loss of fibres during the manufacturing process of the sandwich core material.

Alternatively, a hose which usually is hollow may be filled with fibres or any other material providing enough stability. Those hoses may be bonded either by gluing or melt bonding, or they may be fixed by external connection members such as optionally elastic, circumferential threads wound around the hoses to produce a tow. Of course, this fixing method may be used with fibres or tubes as well.

In order to reduce the weight of the core, the core material may be a lightweight material. Thus, the fibres or tubes or hoses may be hollow or filled with a lightweight material. Materials for filling of, e.g., hoses may be micro balloons, hollow fibres or any other lightweight material. The balloon or fibre material may be glass or plastic, for example. The hose material may comprise glass fibres, paper, aramid fibres or any other fibrous material. In order to strengthen the sandwich core layer in the finished product or during the manufacturing process thereof, the hose material may be permeable to a liquid resin. In this case, the liquid resin used for bonding the sandwich core elements to each other may penetrate partly or fully into the hose material for strengthening it during the curing process of the resin.

In a further embodiment, the core material elements comprise a number, i.e. at least one or a plurality (e.g. two, three, or even more) of braided fibre hoses, which optionally are produced by simultaneously braiding fibre rovings around a core, in particular a foam core, e.g. comprising a polyurethane foam. The foam core may be produced by an extrusion process using a foam supply tubing and a number of core material elements in the form of fibre rovings delivered on a number of bobbins. By coextrusion of the foam inner part and winding the fibre rovings around the foam core, a braided hose may be prepared. Those tows have an improved reliability and may easily be handled. More particularly, the production of the braided hose and foam formation could be done on demand. For example, it may even take place adjacent to the mould into which the sandwich core material is deployed during the manufacturing of a sandwich laminate.

The thus produced tow may be wound around a bobbin or roll for the use as sandwich core material. Due to the foam core and the fibre rovings, such as glass or carbon fibre rovings, the tow is lightweight, but has enough stiffness for providing improved shear strength to a sandwich laminate, for example.

Alternatively, the sandwich core material according to another embodiment comprises a foam, e.g. an endless piece of foam material, i.e. a foam strip. The sandwich core material may have a roundish or rectangular cross section. A rectangular cross section may be preferred if two or more core material elements are arranged in a mould adjacent to each other. In this case, a sheet made of single foam material strips may easily be placed in the mould.

Such a foam strip may be produced by extrusion techniques or may be cut from a broader panel or plate before being wound up on a bobbin or roll.

The sandwich core material according to an embodiment is constituted of core material elements which are equipped with reinforcement fibres. The reinforcement fibres are may be provided at the surface of the core material elements in order to enhance the shear strength of the core material. During the bonding process of two or more of those core material elements, the reinforcement fibres are bonded to a core material element adjacent to the element, thus enhancing the strength of the sandwich core material. Examples of the reinforcement fibre materials are glass fibres, carbon fibres, etc.

Furthermore, when the reinforcement fibres are added to the outer skin of the tow, the sandwich core material may be tailor made with enhanced shear strength.

The sandwich core materials as described above may be used in the manufacturing of sandwich laminates or similar fibre reinforced plastic composites. The sandwich core laminates comprising a sandwich core material having a longitudinal structure and at least one sandwich skin layer on a first and/or a second surface of the sandwich core material may comprise one or more layers or sheets prepared from longitudinal core material elements. A number of at least two or three layers up to six to ten layers may be used. As the core material elements are placed into the mould element by element it is also possible to have a stack of two layers at the side of the laminate and three to five layers in the middle of the laminate to adjust the thickness of the sandwich core material.

When the core material elements are arranged in a mould, the sandwich core material may be bonded by the same resin that bonds the reinforcing fibres in the surrounding composite material, i.e. the material in the first and/or second sandwich skin layers. For the manufacturing of sandwich laminates, a vacuum assisted resin injection moulding process may be used in which a vacuum sheet or foil is placed over the laminate, vacuum is applied, resin is infused into the laminate and subsequently cured or consolidated by means of cooling and, optionally under pressurizing the laminate. Thereby, a resin infused sandwich laminate having a sandwich core material may be prepared. The resin infusion moulding process is well-known to the skilled person so that he may easily adapt it to specific applications as described herein.

Suitable resins for the use as matrix material in the skin layers and/or in the sandwich core material are epoxy, polyester, vinyl ester, poly urethane or other thermosetting plastic materials. However, the matrix material may also comprise or consist of a thermoplastic material, such as polypropylene, ABS (acryl nitrile styrene) or similar resins.

The sandwich core materials and the sandwich laminates may be used for manufacturing of a wind turbine blade because of the overall longitudinal shape of such a blade. As the flexible core material elements have a longitudinal structure such as a strip, tow or thread themselves, they may easily be placed in longitudinal direction of the blade into the mould. Thereby a good stiffness of the wind turbine blade, especially in its longitudinal direction, may be achieved.

The sandwich core material used in the wind turbine blade has the function of a support structure. It may be arranged either as an interior core of a blade with an upper laminate part and a lower laminate part or a core layer of a sandwich laminate constituting the upper part blade shell or the lower part blade shell. If the length and the size of the blades increase to about 5 meters or more, the blades are generally constituted of upper and lower part blade shells enclosing or embedding a cavity or space. For stability reasons, one or more webs, e.g. internal spacer or stabilizer elements, may be provided between the upper part blade shell and the lower part blade shell. Thus, the lightweight wind turbine blades have improved stiffness, the tailor made shear strength of the sandwich core material, the improved manufacturing process, especially because of easy handling (e.g. storage, transport, etc.) of the raw materials and the reduction of waste (e.g. cuts of core material) during the production process so forth.

The above described sandwich core materials and their specific use in applications such as sandwich laminates or wind turbine blades may be prepared by the method.

According to an embodiment of the method, a number of flexible core material elements having a longitudinal structure (e.g. tows or threads, substantially endless foam material strips, etc) are arranged into a mould. "Arranged" means that the flexible core material elements are placed, disposed or laid down in a suitable predefined pattern directly or indirectly (e.g. on a first or lower skin layer) into the mould. This arranging step may be done by an automatic process. For example, a strip placing device such as a robot device with an automatically driven robot arm, may be used for arranging the flexible core material elements into the mould. The flexible core material elements may be prepared and delivered, for example on a storage device, or may be produced in line, that means directly before placing them into the mould. The latter will be a so-called "on site process" in which the elements are produced in front of the mould, for example in an automatic process line. The method thus saves time and reduces men hours because of the automatic procedure and, therefore, is cheaper than the commonly used manufacturing methods.

For this automatic process, the flexible core material elements may be delivered from a bobbin and/or roll in the step of deploying them into the mould. In case the flexible core material elements are in a substantially endless form, they may be stored and transported on such bobbins or rolls and may be put into a robot device for being delivered to the mould. After the desired pattern of the flexible core material elements has been arranged in the mould, the core material elements are cut. Thereafter, a second or further flexible core material element may be placed in the same mould, e.g. as a second or further core material layer or a further strip next to the first strip. The desired pattern of the core material elements may be predefined and stored in a storage device of a processing unit of the robot device.

In another embodiment, the method comprises the step of bonding the core material elements together, either by a glue or by a resin. This is usually done before the flexible core material elements are prepared for storage or delivery on a bobbin or roll. For example, a number of hollow tubes and/or fibres (e.g. at least two, possibly three or more, in particular 6, 7 or 8) are arranged to a tow and fixed by means of gluing or partially melting the plastic (or resin) of the outer surfaces of the tubes or fibres in order to obtain a core material tow made of a number of hollow tubes or fibres. Alternatively, the hollow tubes or fibres may be bound together by a thread wound around the plurality of tubes or fibres. The thread may be an elastic circumferential thread which is wound in a substantially helical arrangement around the tubes or fibres. If a further reinforcing strength of the tube material or an improved fixation is desired, two or more threads may be wound in such a substantially helical arrangement around the tubes. For example, two threads in a counter helical arrangement may be used.

In such a sandwich core tow, tubes, fibres, strips of foam material, either with a hollow or solid cross sectional structure, may be used. The tubes, fibres, strips may be made of a lightweight material and/or have a hollow cross sectional shape which may be filled with a lightweight material in order to reduce the weight of the core material.

In an embodiment of the method, a plurality of flexible core material elements having a substantial rectangular shape are arranged in a sheet-like form. The use of core material elements having a substantially rectangular shape results in reducing the total weight of the core material layer. The reason is that, when using elements having a substantially rectangular shape, the space between the core material elements is reduced compared to a sheet made of circular elements. As the core material is usually bonded by means of melting resins or using glue, the amount of resin or glue impregnated into the layer of core material elements is as small as possible because of the small spaces between the core material elements. Resins for the bonding may be those resins that are used in the sandwich skin(s). Hence, an improved lightweight sandwich core material and/or sandwich laminate may be prepared by this method. The sandwich laminate has an improved buckling strength because of the smooth surface provided by arranging the rectangular shaped core material elements.

BRIEF DESCRIPTION OF THE DRAWINGS

Other features will become apparent from the following detailed description considered in conjunction with the accompanying drawings. It is to be understood, however, that the drawings are designed solely for the purposes of illustration and not as a definition of the limits of the claims.

DETAILED DESCRIPTION OF INVENTION

Figure 1:
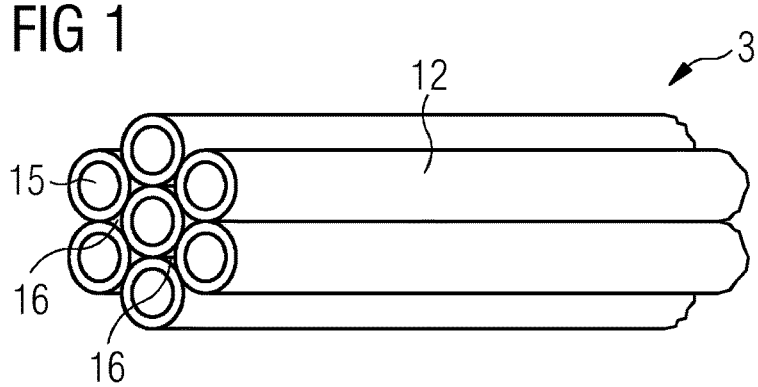
FIG. 1 shows a perspective view of a flexible core material element according to a first embodiment.

In the drawings, like reference numbers refer to like objects throughout. Objects in the diagrams are not necessarily drawn to scale.

FIG. 1 shows a perspective view of a flexible core material element 3 according to a first embodiment comprising seven tubes 12 made of a polymer material. Each tube 12 is constructed with a hollow tube cross section 15. The seven tubes 12 are arranged in the form of a tow, wherein the tow comprises one tube 12 in the middle and six tubes 12 around this one middle tube 12 in the cross section of the tow. The six outer tubes 12 are bound to the tube 12 in the middle and to each adjacent tube 12 by melting the surface of the polymeric material and bonding them to each other at their respective contact points.

This tow may by used as a flexible core material element 3 because of its specific flexibility that allows winding it around a bobbin or roll for storage, transportation and delivery to a mould. Thus, the delivery into the mould may be done automatically by means of a respective robot device by using the sandwich core element delivered on a bobbin.

Figure 2:
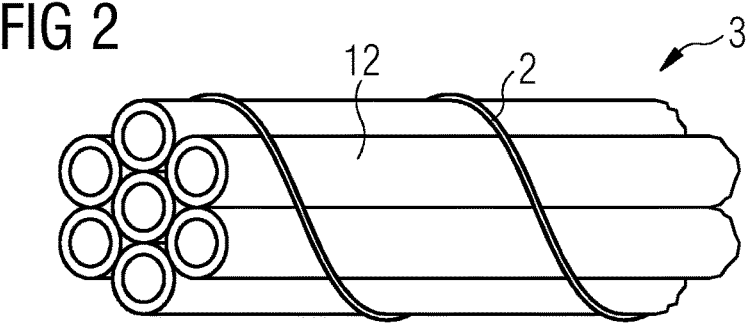
FIG. 2 shows a perspective view of a flexible core material element according to a second embodiment.

FIG. 2 shows a similar flexible core material element 3 according to a second embodiment. In this embodiment, seven hollow tubes 12 are arranged in a similar manner as shown in FIG. 1, but are fixed together by circumferential threads 2. Those threads 2 may be made of a plastic or fibre material which may be elastic so that it may easily be wound around the tow in a helical manner. Instead of helical threads 2, a plurality of threads wound at distinct distances from the beginning of the tow may be arranged for fixedly combining the tubes 12 to a tow. The threads 2, thus, function as external connecting means of the tubes 12.

Of course, the bonding by molten resin as explained in the first embodiment shown in FIG. 1 (an internal connection) may be combined with this external connection.

Figure 3:
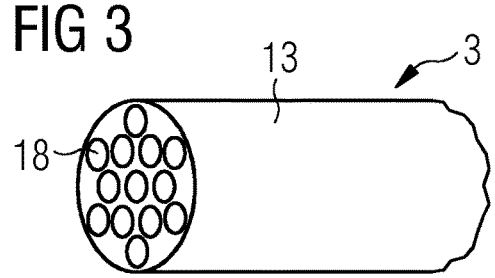
FIG. 3 shows a perspective view of a flexible core material element according to a third embodiment.

FIG. 3 shows a perspective view of a flexible core material element 3 according to a third embodiment. The core tow of this embodiment comprises a hose 13 filled with a lightweight material 18. The material of the hose 13 may be permeable to an injection resin used in order to allow an intrusion of the resin into the hose material and, thus, a fixation in the surrounding core material layer or the surrounding sandwich laminate layers. The material 18 filled into the hose 13 may be impermeable in order to avoid an intrusion of high amount of heavy weight resins. In FIG. 3, the hose 13 is filled with micro balloons 18 which are lightweight due to the high amount of air or another gas filled into the balloons. Alternatively, other lightweight materials may be used instead of the micro balloons 18, such as hollow fibres, tubes, foams or the like.

Figure 4:
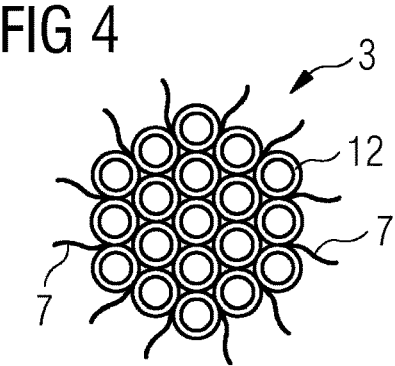
FIG. 4 shows a cross section of a flexible core material element according to a fourth embodiment.

In FIG. 4, a flexible core material element 3 according to a fourth embodiment is shown in its cross section. The core tow 3 has reinforcement fibres 7 on the surface to improve the fixation of the flexible core material element 3 in the core material layer or in the sandwich laminate. The general structure is similar as the structure of the tow of the first embodiment, except the different number of hollow tubes 12 combined as a tow and the reinforcement fibres 7 embedded in the surface of the tow 3. The reinforcement fibres 7 may be of any common fibre material as long as it is compatible to the resin matrix material used for the core layer and/or the sandwich laminate skin layers to accomplish the effects of improving the shear strength of a sandwich laminate produced with those tows 3.

Figure 5:
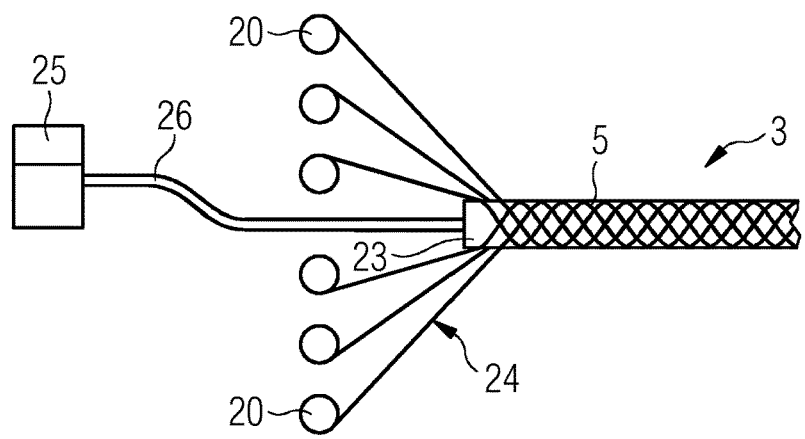
FIG. 5 shows a manufacturing procedure of a flexible core material element according to a fifth embodiment.

FIG. 5 shows a flexible core material element according to a fifth embodiment during its manufacturing process. The flexible core material element 3 comprises a foam material inner core element 23 and a number of fibre rovings 24 (e.g. six as shown in FIG. 5) all of which were combined to a braided hose 5.

The foam material of the inner core element 23 may be mixed in a foam ingredients mixing machine 25 and supplied to the braiding machine by means of a foam supply tube 26. This may, for example, realised by an extruder which extrudes the foam material inner core element 23 by a co-extrusion at the same time as the fibre rovings 24 are braided around the co-extruded inner core element 23. The obtained tow has a fibre braided hose structure 5 suitable for being used in the production of a fibre core material or a sandwich laminate.

Figure 6:
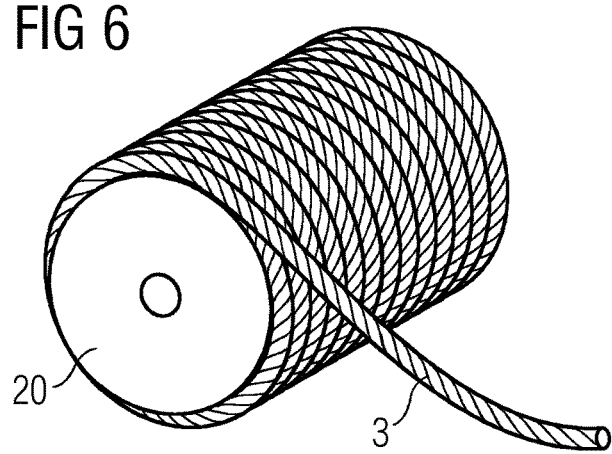
FIG. 6 shows a perspective view of a flexible core material element according to FIG. 2 wound on a bobbin.

FIG. 6 shows a perspective view of a flexible core material element 3 according to an embodiment which is delivered on a bobbin 20. The bobbin 20 may bears a substantially endless portion of a tow 3 for storage, transport or delivery of the flexible core material element 3. The tow 3 shown in FIG. 6 has a general structure as the second embodiment shown in FIG. 2. However, it may also have any of the afore-mentioned exemplified cross sections and general structures or the like.

Figure 7:
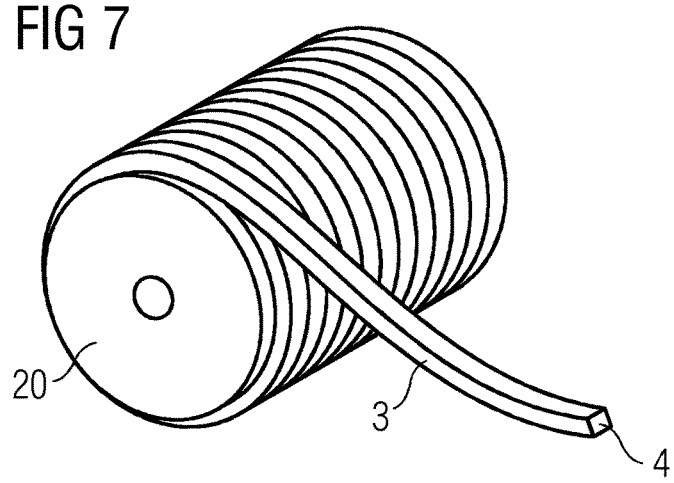
FIG. 7 shows a perspective view of a flexible core material element according to a sixth embodiment wound on a bobbin.

Another example of a flexible core material element 3 delivered on a bobbin 20 is shown in FIG. 7. According to this embodiment, the cross section of the flexible core element 3 has a substantially rectangular shape 4. This cross section provides that in a sheet of a plurality of those flexible core material elements, the spaces between the elements 3 are reduced or totally eliminated. Lightweight material may then be impregnated with a resin for bonding which is filled into the spaces between the elements as used. If there are no such spaces or only small spaces between the elements 3, the weight of such a sheet is significantly reduced.

Figure 8:
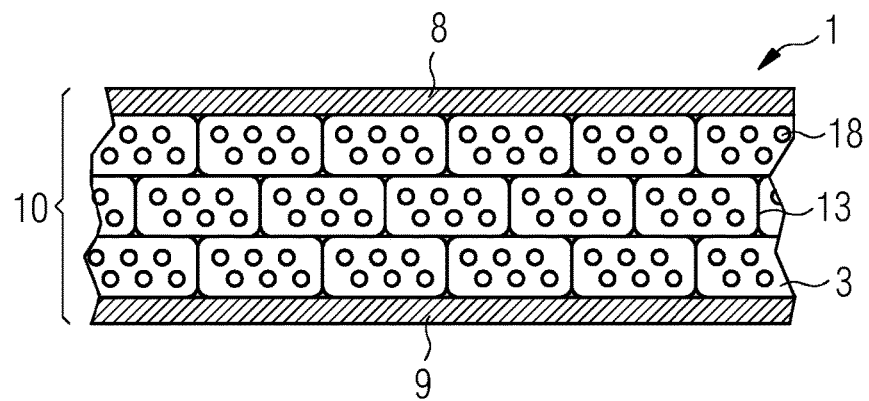
FIG. 8 shows a cross section of a sandwich laminate according to an embodiment.

This is for example shown in the sandwich laminate 10 of FIG. 8 comprising a first skin layer 8 and a second skin layer 9 and a sandwich core material layer 1 between both skin layers 8, 9. The sandwich core material comprises three layers of single layered core material elements 3 according to the third embodiment as shown in FIG. 3. The flexible core material elements 3 (shown in a cross section) comprise an outer hose filled with micro balloons 18. The layers of flexible core material elements 3 are packed nearly completely with the elements 3 made of a lightweight material and there remains nearly no space for a resin which is for example used in a subsequent vacuum-assisted resin injection moulding process for producing a sandwich laminate.

Figure 9:
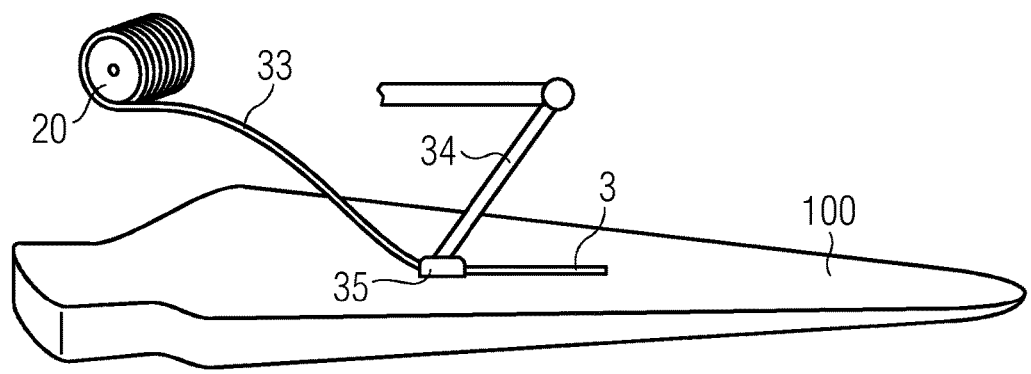
FIG. 9 shows a manufacturing procedure of a wind turbine blade according to an embodiment.

FIG. 9 shows a manufacturing procedure of a wind turbine blade using an automatic process for placing the core material elements 3 into a mould 100. The flexible core material elements are delivered on a bobbin 20. A robot device 34 transports the delivered core tow 33 to the mould 100 in a continuous process. The robot device 34 has a placement head 35 for arranging the flexible core material elements into the mould 100 in a desired pattern. After finalizing the placement of the first element, this element is cut and a second and further element may be placed into the same mould next or over the first element until the desired thickness and shape of the sandwich core material is achieved.

Thereafter, the mould may be heated to bond the core material elements by partially melting the plastic or resin of the outer surfaces of the elements. Alternatively, the first and second skin layers are placed on the surface of the sandwich core material and all three layers are pressed, optionally under heating, in order to generate a sandwich laminate. In this case, the plastic of the skin layers or an intrusion resin for a vacuum resin intrusion process may intrude into the sandwich core material layer for enhancing the stability and stiffness of the sandwich laminate. If for example the part to be produced, e.g. a wind turbine blade, is produced by vacuum-assisted resin injection moulding, a vacuum sheet of foil is placed over the laminate, vacuum is applied, resin is infused into the laminate and subsequently cured or consolidated by means of cooling down- This may optionally be carried out under pressurizing the laminate. Thereby, a resin infused sandwich laminate having a sandwich core material is prepared.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. While the invention has been described with reference to wind turbine blades, other blades, wings or rotors for airplanes, helicopters, coolers, or car parts as well as parts in the automotive industry or similar devices may also be prepared with the method of the invention. The sandwich laminate layers having sandwich core materials or flexible core material elements of the present invention may be widely used in similar technical fields. It should be noted that the term "comprising" does not exclude other elements or steps and the use of articles "a" or "an" does not exclude a plurality. A "means", "device" or "element" can comprise a number of separate means, devices or elements, unless otherwise stated.

The invention claimed is:

1. A process for manufacturing a sandwich core material comprising:
    deploying a plurality of flexible core material elements from a roll or a bobbin having the flexible core material elements wound thereon, each of the flexible core material elements having a longitudinal structure, wherein each of the core material elements is formed as a tow from a plurality of hollow tubes being connected together, where one of the plurality of hollow tubes is in the middle and the remaining of the plurality of hollow tubes are arranged around the middle hollow tube;
    arranging the flexible core material elements from the bobbin or roll in a mould;
    after the arranging, cutting the flexible core material elements to a desired dimension to form a layer in the mould; and
    repeating the process at least once until the layers in the mould comprise a desired thickness and shape of the sandwich core material; and
    bonding the material layers together to one another to form the sandwich core material.

2. The process of claim 1, wherein the arranging is done by a robot device which arranges the flexible core material elements in the mould.

3. The process of claim 2, wherein the robot device comprises a placement head for arranging the flexible core material elements in the mould.

4. The process of claim 1, wherein the flexible core material elements comprise a plastic or a resin on an outer surface thereof, and wherein the process further comprises heating the material layers to form the sandwich core material.

5. The process of claim 1, wherein the bonding is done by:
    placing a first and a second skin layer on a surface of the flexible core material elements and applying heat and/or pressure to form the sandwich core material.

6. The process of claim 1, wherein the plurality of hollow tubes is connected by helical threads wound around the plurality of hollow tubes.

7. The process of claim 1, wherein the flexible core material element comprises reinforcement fibres about a perimeter thereof.

8. The process of claim 1, wherein the flexible core material elements comprise a sandwich skin layer on a first and/or a second surface of the flexible material core elements.

9. The process of claim 1, wherein the plurality of hollow tubes is connected by a bonding at their respective contact points.

10. The process of claim 9, wherein the plurality of hollow tubes is further connected by helical threads wound around the plurality of hollow tubes.

* * * * *